US012223920B2

(12) United States Patent
Wang et al.

(10) Patent No.: US 12,223,920 B2
(45) Date of Patent: Feb. 11, 2025

(54) BACKLIGHT CONTROL CIRCUIT

(71) Applicant: Radiant Opto-Electronics Corporation, Kaohsiung (TW)

(72) Inventors: Li-Fei Wang, Kaohsiung (TW); Yu-Lin Hsieh, Kaohsiung (TW); Sheng-Kai Fang, Kaohsiung (TW); Pei-Ling Kao, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/402,645

(22) Filed: Jan. 2, 2024

(65) Prior Publication Data

US 2024/0144890 A1 May 2, 2024

Related U.S. Application Data

(63) Continuation of application No. PCT/CN2022/115661, filed on Aug. 30, 2022.

(30) Foreign Application Priority Data

Aug. 31, 2021 (WO) ................ PCT/CN2021/115842

(51) Int. Cl.
*G09G 3/34* (2006.01)

(52) U.S. Cl.
CPC ... *G09G 3/3426* (2013.01); *G09G 2310/0264* (2013.01); *G09G 2320/0233* (2013.01); *G09G 2360/16* (2013.01)

(58) Field of Classification Search
CPC ......... G09G 3/3426; G09G 2310/0264; G09G 2320/0233; G09G 2360/16;
(Continued)

(56) References Cited

U.S. PATENT DOCUMENTS 5,751,386 A 5/1998 Kanda
7,795,821 B2 9/2010 Jun
(Continued)

FOREIGN PATENT DOCUMENTS

CN 101055376 10/2007
CN 101192375 6/2008
(Continued)

*Primary Examiner* — Jonathan A Boyd
(74) *Attorney, Agent, or Firm* — Winston Hsu

(57) ABSTRACT

A backlight control circuit for a surface light emitting device is provided. The backlight control circuit includes a driving circuit. The driving circuit is configured to generate a plurality of driving currents to drive the surface light emitting device such that a plurality of backlight blocks of the surface light emitting device generate a plurality of brightness values. The surface light emitting device is divided into a first backlight area and a second backlight area. The second backlight area is closer to an edge of the surface light emitting device than the first backlight area. A first driving current of the plurality of driving currents is utilized for driving the light source of the first backlight area. A second driving current of the plurality of driving currents is utilized for driving the light source of the second backlight area. The second driving current is greater than the first driving current.

8 Claims, 14 Drawing Sheets

(58) Field of Classification Search
CPC ... G09G 2320/0626; G09G 2320/0285; G09G 2320/064; G09G 2360/145
See application file for complete search history.

(56) References Cited

U.S. PATENT DOCUMENTS

| | | | | |
|---|---|---|---|---|
| 11,211,018 | B1 | 12/2021 | Sun | |
| 11,475,865 | B2 | 10/2022 | Chappalli | |
| 11,594,189 | B2 | 2/2023 | Rajamani | |
| 2007/0115228 | A1 | 5/2007 | Roberts | |
| 2009/0086473 | A1 | 4/2009 | Tan | |
| 2010/0165002 | A1 | 7/2010 | Ahn | |
| 2012/0262940 | A1 | 10/2012 | Miyairi | |
| 2013/0155125 | A1 | 6/2013 | Inamura | |
| 2015/0035848 | A1* | 2/2015 | Furumoto | G09G 5/026 345/589 |
| 2019/0348001 | A1 | 11/2019 | Shi | |
| 2020/0226990 | A1 | 7/2020 | Jun | |
| 2022/0101805 | A1 | 3/2022 | Hsu | |
| 2023/0120576 | A1 | 4/2023 | Olchovik | |

FOREIGN PATENT DOCUMENTS

| | | | |
|---|---|---|---|
| CN | 101763838 | | 6/2010 |
| CN | 101894524 | | 11/2010 |
| CN | 102235624 | | 11/2011 |
| CN | 102282603 | | 12/2011 |
| CN | 103606353 | | 2/2014 |
| CN | 104011786 | | 8/2014 |
| CN | 105185328 | A | 12/2015 |
| CN | 106205506 | | 12/2016 |
| CN | 211086865 | U | 7/2020 |
| CN | 212516503 | U | 2/2021 |
| CN | 109164641 | B | 4/2021 |
| CN | 113129846 | | 7/2021 |
| JP | 2010-54726 | | 3/2010 |
| KR | 10-1461995 | B1 | 11/2014 |
| TW | 201123145 | | 7/2011 |
| TW | M607910 | U | 2/2021 |

* cited by examiner

| BC1 | BC2 | BC3 | BC4 | BC5 | |
|---|---|---|---|---|---|
| 0.919 | 0.947 | 0.987 | 0.96 | 0.961 | BR1(G1) |
| 0.923 | 1.029 | 1.006 | 1.028 | 0.975 | BR2(G2) |
| 0.944 | 1.028 | 1.015 | 1.017 | 0.958 | BR3(G3) |
| 0.969 | 1.024 | 1.017 | 1.024 | 0.949 | BR4(G4) |
| 0.971 | 0.992 | 0.972 | 0.983 | 0.918 | BR5(G5) |

FIG. 4

| BC1 | BC2 | BC3 | BC4 | BC5 | |
|---|---|---|---|---|---|
| 0.85 | 0.85 | 0.85 | 0.85 | 0.85 | BR1(G1) |
| 0.85 | 0.859 | 0.859 | 0.859 | 0.85 | BR2(G2) |
| 0.85 | 0.91 | 1 | 0.97 | 0.85 | BR3(G3) |
| 0.85 | 0.859 | 0.859 | 0.85 | 0.85 | BR4(G4) |
| 0.85 | 0.85 | 0.85 | 0.85 | 0.85 | BR5(G5) |

FIG. 5

| BC1 | BC2 | BC3 | BC4 | BC5 | |
|---|---|---|---|---|---|
| 40 | 32.407 | 31.031 | 31.896 | 40 | BR1(G1) |
| 32.688 | 26.321 | 26.208 | 25.511 | 30.857 | BR2(G2) |
| 31.717 | 25.239 | 26.359 | 25.44 | 32.049 | BR3(G3) |
| 29.92 | 25.721 | 26.13 | 26.194 | 32.258 | BR4(G4) |
| 40 | 31.299 | 32.612 | 32.708 | 40 | BR5(G5) |

FIG. 8

BACKLIGHT CONTROL CIRCUIT

CROSS REFERENCE TO RELATED APPLICATIONS

This application is a continuation application of PCT Application No. PCT/CN2022/115661, filed on Aug. 30, 2022, which claims priority from PCT Application No. PCT/CN2021/115842, filed on Aug. 31, 2021. The content of each application is incorporated herein by reference.

BACKGROUND OF THE INVENTION

1. Field of the Invention

The present invention relates to a backlight control circuit, and more particularly, to a backlight control circuit capable of improving display uniformity.

2. Description of the Prior Art

With advancements in technology, liquid crystal displays (LCDs) are widely applied in various electronic products, e.g., notebooks, tablets, mobile phones, televisions. The electronic product equipped with the LCD has become an indispensable part of people's daily life. In general, images may be displayed through the LCD while using the electronic product, so as to allow the user to view the images displayed on the LCD. Since the display panel does not emit light itself, the LCD is usually equipped with a backlight module for providing required light sources to display the image. For example, light-emitting diodes (LEDs) offer advantages of energy savings, long device life time, no mercury used, high achievable color gamut, without idle time and fast response speed, so that the LED technology has been widely applied in fields of light sources for display and illumination. However, the problems of uneven brightness and darkness often occur in the conventional backlight device, thus resulting in dark bands at the corners or dark lines at the edges of the appearance. Besides, the brightness uniformity of the backlight device also does not meet the specification requirements. Further, as the size of the display device becomes larger, the power consumption of the backlight device may increase. A conventional method for solving the above problems is to change the arrangement of the light sources. For example, the pitches of the light sources in alight source array may be changed for improving the uniformity. Another conventional method for solving the above problems is to employ the configurations of different levels of light sources by using the light source allocation (Bin) technique. However, the conventional methods still have the disadvantages of high material cost of light source components and long production time. Thus, how to solve the above-mentioned problems has become an important issue in the field.

SUMMARY OF THE INVENTION

It is therefore an objective of the present invention to provide a backlight control circuit capable of improving display uniformity, to solve the above-mentioned problems.

According to an aspect of an embodiment, a backlight control circuit for a surface light-emitting device is disclosed. The backlight control circuit for driving a surface light-emitting device, includes a driving circuit configured to generate a plurality of driving currents to drive the surface light-emitting device such that a plurality of backlight zones generates a plurality of brightness values, and each backlight zone comprising at least one light source for emitting light; wherein the surface light emitting device is divided into at least a first backlight area and a second backlight area, the second backlight area is closer to an edge of the surface light emitting device than the first backlight area, a first driving current of the plurality of driving currents is utilized for driving the light source of the backlight zone of the first backlight area, a second driving current of the plurality of driving currents is utilized for driving the light source of the backlight zone of the second backlight area, and the second driving current is greater than the first driving current.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram illustrating the uniformity of the backlight zones according to an embodiment of the present invention.

FIG. 5 is a schematic diagram illustrating the target uniformity of the backlight zones according to an embodiment of the present invention.

FIG. 8 to FIG. 11 are schematic diagrams illustrating the adjusted driving currents of the backlight zones according to embodiments of the present invention.

DETAILED DESCRIPTION

Figure 1:
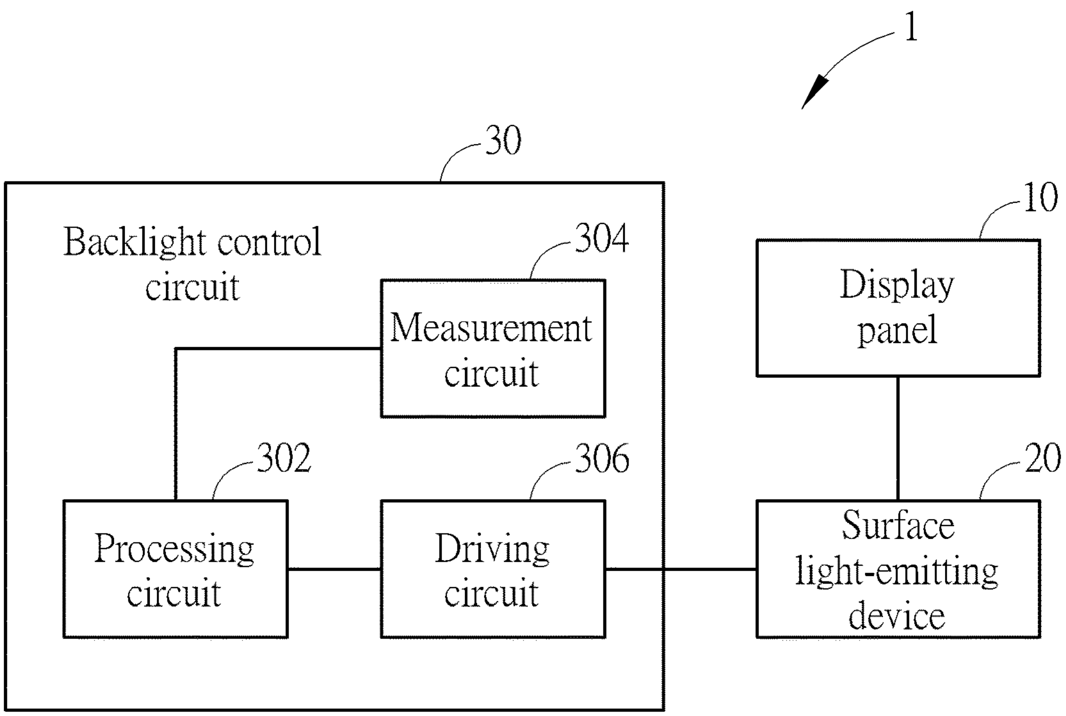
FIG. 1 is a schematic diagram of a display apparatus according to an embodiment of the present invention.
Figure 2:
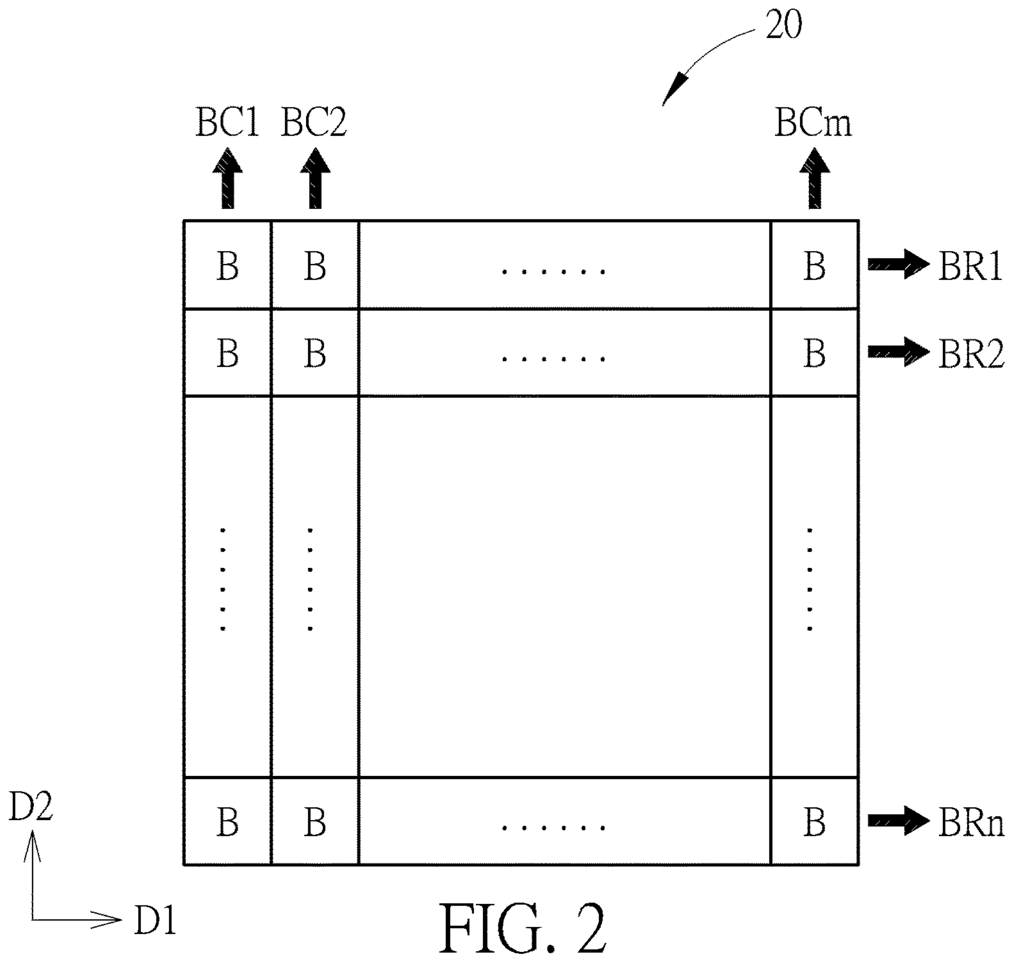
FIG. 2 is a schematic diagram of a surface light-emitting device shown in FIG. 1 according to an embodiment of the present invention.

Please refer to FIG. 1, which is a schematic diagram of a display apparatus 1 according to an embodiment of the present invention. The display apparatus 1 includes a display panel 10, a surface light-emitting device 20 and a backlight control circuit 30. The display panel 10 may be an LCD panel, and this should not be a limitation of the invention. The display panel 10 may be disposed above the surface light-emitting device 20. The surface light-emitting device 20 is utilized for providing backlight sources for the display panel 10. For example, please refer to FIG. 2, which is a schematic diagram of the surface light-emitting device 20 according to an embodiment of the present invention. The surface light-emitting device 20 may be divided into a plurality of backlight zones B. The plurality of backlight zones B of the surface light-emitting device 20 may correspond to the overall display area of the display panel 10. The plurality of backlight zones B may be utilized for providing backlight sources for the overall display area of the display panel 10. The backlight zones arranged along a direction D1 (i.e. first direction) may be defined as a zone row, or referred to as a first group. The backlight zones arranged along a direction D2 (i.e. second direction) maybe defined as a zone column, or referred to as a second group. The direction D1 is not parallel to the direction D2. Each of the zone rows and the zone columns includes at least one backlight zone. As shown in FIG. 2, the surface light-emitting device 20 includes zone rows BR1 to BRn and zone columns BC1 to BCm. Each zone row includes m backlight zones. Each zone column includes n backlight zones. Each backlight zone includes at least one light source, and the light emitted from the at least one light source illuminates the display panel 10.

The backlight control circuit 30 is coupled to the surface light-emitting device 20 for driving the surface light-emitting device 20, such that the surface light-emitting device 20 provides the uniform backlight source for the display panel 10. The backlight control circuit 30 includes a processing circuit 302, a measurement circuit 304 and a driving circuit 306. The measurement circuit 304 is utilized for measuring brightness of the backlight zones of the surface light-emitting device 20. For example, the measurement circuit 304 may include an image sensor (not shown in figures). The image sensor may be a charge-coupled device (CCD) image sensor or a complementary metal-oxide semiconductor (CMOS) image sensor, but not limited thereto. The driving circuit 306 is utilized for generating a plurality of driving currents, a plurality of pre-driving currents or a plurality of adjusted driving currents for driving the surface light-emitting device 20. The driving circuit 306 may be a pulse width modulation (PWM) circuit. The processing circuit 302 is coupled to the measurement circuit 304 and the driving circuit 306 for generating a plurality of adjustment values corresponding to the plurality of backlight zones, so that the driving circuit 306 is configured to generate a plurality of adjusted driving currents to drive the plurality of backlight zones according to the plurality of adjustment values and the plurality of driving currents. In addition, the display apparatus 1 further includes a display driving circuit (not shown in figures) for controlling image display operations of the display panel 10.

Figure 3:
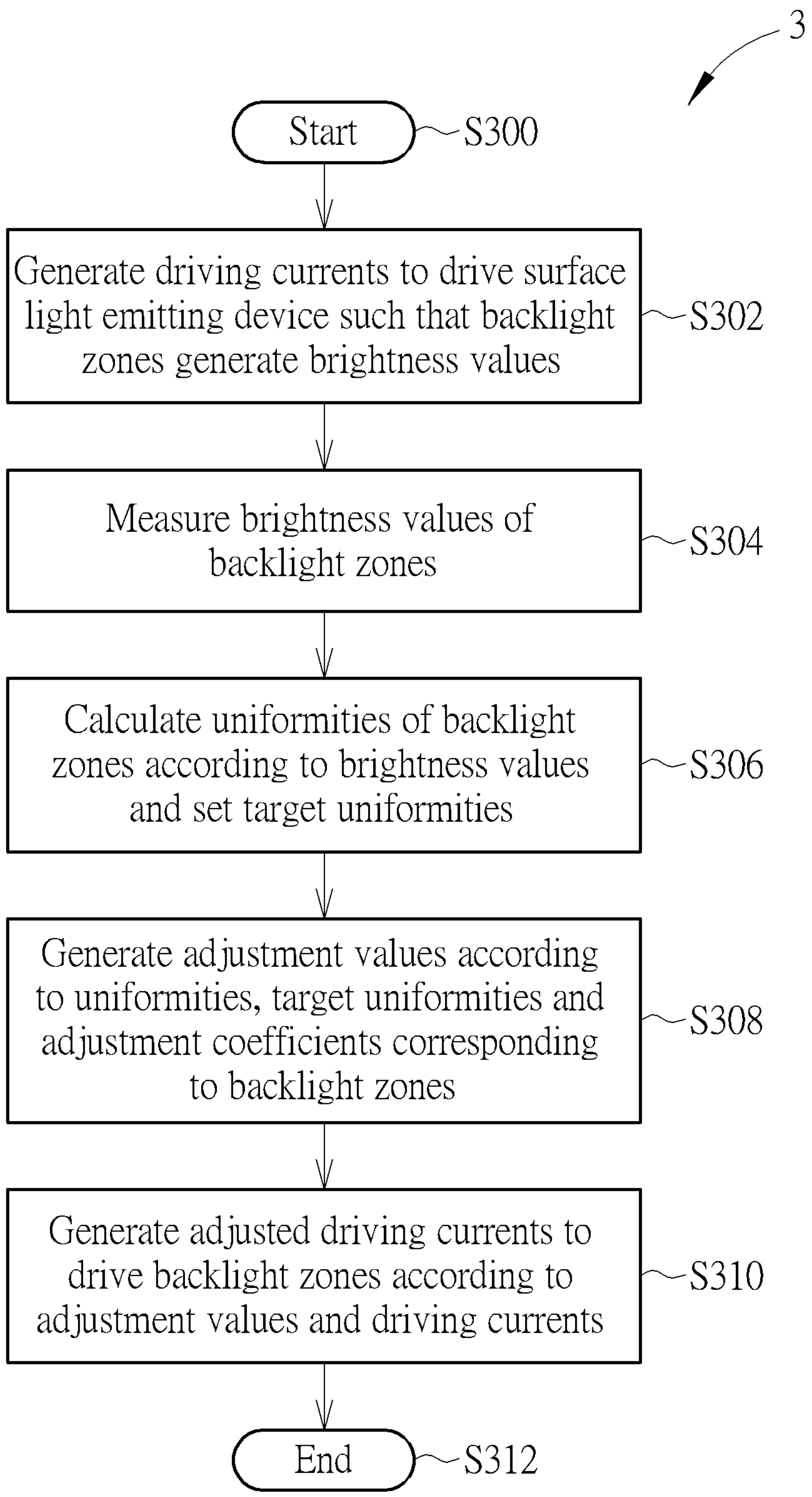
FIG. 3 is a flow diagram of a procedure according to a first embodiment of the present invention.

Regarding operations of the display apparatus 1, an operation method of the display apparatus 1 may be summarized in an exemplary procedure 3. Please refer to FIG. 3. FIG. 3 is a flow diagram of the procedure 3 according to an embodiment of the present invention. The procedure 3 includes the following steps:

Step S300: Start.

Step S302: Generate a plurality of driving currents to drive the surface light-emitting device such that a plurality of backlight zones generates a plurality of brightness values.

Step S304: Measure the plurality of brightness values of the plurality of backlight zones.

Step S306: Calculate a plurality of uniformities of the plurality of backlight zones according to the plurality of brightness values and set a plurality of target uniformities.

Step S308: Generate a plurality of adjustment values according to the plurality of uniformities, the plurality of target uniformities and a plurality of adjustment coefficients corresponding to the plurality of backlight zones.

Step S310: Generate a plurality of adjusted driving currents to drive the plurality of backlight zones according to the plurality of adjustment values and the plurality of driving currents.

Step S312: End.

According to the procedure 3, in Step S302, the driving circuit 306 generates a plurality of driving currents to drive the surface light-emitting device 20 such that a plurality of backlight zones of the surface light-emitting device 20 generate a plurality of brightness values. In Step S304, the measurement circuit 304 measures the plurality of brightness values of the plurality of backlight zones of the surface light-emitting device 20. For example, the measurement circuit 304 measures a respective brightness value for each backlight zone. Each backlight zone has a corresponding brightness value.

In Step S306, the processing circuit 302 calculates a plurality of uniformities of the plurality of backlight zones of the surface light-emitting device 20 according to the plurality of brightness values, and sets a plurality of target uniformities for the plurality of backlight zones. The processing circuit 302 calculates the uniformity of each backlight zone according to the plurality of brightness values corresponding to the backlight zones measured by the measurement circuit 304. For example, the processing circuit 302 sets a target brightness value for each backlight zone and calculates a ratio of a brightness value of the each backlight zone to a maximum of the plurality of target brightness values of the plurality of backlight zones so as to obtain a uniformity of the each backlight zone. As shown in FIG. 4, taking the surface light-emitting device 20 with 5 by 5 backlight zones for example, the surface light-emitting device 20 includes zone rows BR1 to BR5 and zone columns BC1 to BC5. The processing circuit 302 calculates the uniformity of each backlight zone. As shown in FIG. 4, the number in each backlight zone represents the corresponding uniformity of the backlight zone. As the uniformity is greater than 1, this means that the brightness value of the backlight zone is greater than the maximum target brightness value among the plurality of target brightness values.

Moreover, in Step S306, the processing circuit 302 may query a target brightness value table to obtain the corresponding target brightness value of each backlight zone. The target brightness value table maybe stored in a lookup table available in the storage device (not shown in figures) of the display apparatus 1. The processing circuit 302 may query the target brightness value table stored in the storage device to determine the corresponding target brightness value of each backlight zone. As the target brightness value of each backlight zone is set, the processing circuit 302 calculates the target uniformity of each backlight zone according to the plurality of target brightness values corresponding to the plurality of backlight zones. For example, the processing circuit 302 determines a maximum target brightness value among the plurality of target brightness values of the plurality of backlight zones of the surface light-emitting device 20. For each backlight zone, the processing circuit 302 calculates a ratio of a target brightness value of the each backlight zone to a maximum target brightness value of the plurality of target brightness values so as to obtain a target uniformity of the each backlight zone. As shown in FIG. 5, the processing circuit 302 calculates the target uniformity of the each backlight zone. The number in each backlight zone represents the corresponding target uniformity of the backlight zone. The target uniformity of the backlight zone in the center of the surface light-emitting device 20 is equal to 1, and the target uniformity of all other backlight zones is less than 1. This means that the brightness of the backlight zone in the middle is designed to achieve the maximum brightness and the brightness of the backlight zones in the surrounding may decrease according to the requirements.

In another embodiment, the processing circuit 302 obtains a target uniformity of a central backlight zone of the surface light-emitting device 20. The central backlight zone may be located at or near a center of the surface light-emitting device 20. Moreover, the central backlight zone may be located at an intersection of a zone row and a zone column. The processing circuit 302 obtains target uniformities of backlight zones on both side edges of a zone row including the central backlight zone in the plurality of zone rows and calculates the target uniformity of each backlight zone of the zone row according to an equation. Further, the processing circuit 302 obtains target uniformities of backlight zones on both side edges of a zone column including the central backlight zone in the plurality of zone columns and accordingly calculates the target uniformity of each backlight zone of the zone column according to an equation, the target uniformity of the central backlight zone and the target uniformities of the backlight zones on the both sides of the zone column.

Figure 6:
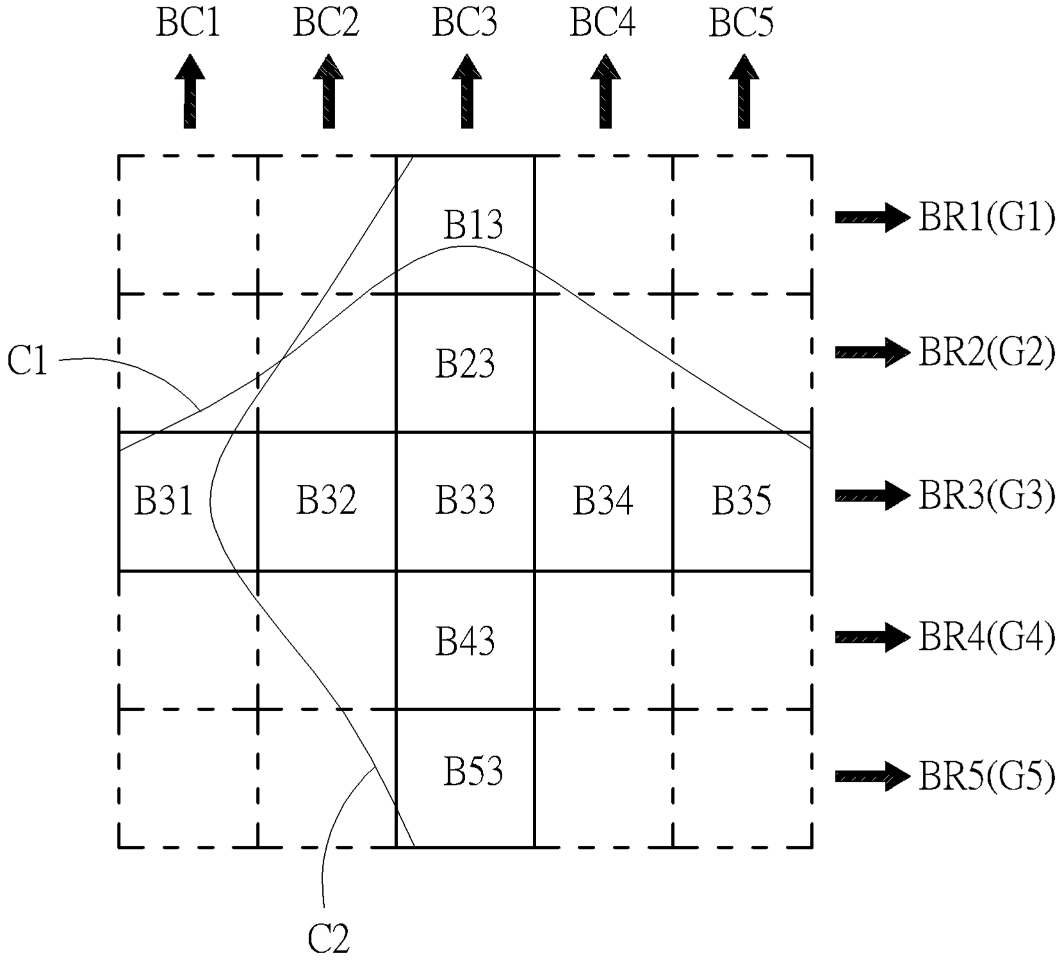
FIG. 6 is a schematic diagram illustrating an operation of the target uniformity of the backlight zones according to an embodiment of the present invention.

For example, please refer to FIG. 6. FIG. 6 is a schematic diagram illustrating an operation of the target uniformity of the backlight zone according to an embodiment of the present invention. Taking the surface light-emitting device 20 with five by five backlight zones for example, as shown in FIG. 6, the backlight zone B33 may be determined as the central backlight zone. The backlight zone B33 is located at an intersection of the zone row BR3 and the zone column BC3 of the surface light-emitting device 20. The processing circuit 302 obtains the target uniformity of the backlight zone B33 (i.e., central backlight zone) and the target uniformities of the backlight zones (i.e., backlight zones B31 and B35) on both side edges of the zone row BR3 including the backlight zone B33. For example, the processing circuit 302 may calculate target brightness values of the backlight zones B33, B31 and B35 by using the above-mentioned method according to predetermined target brightness values of the backlight zones B33, B31 and B35. The predetermined target brightness values may be preset. For example, the target uniformities of the backlight zones B33, B31 and B35 may be preset or obtained by querying the look-up table. The processing circuit 302 may calculate the target uniformity of each backlight zone of the zone row BR3 according to an equation F1 and the target uniformities of the backlight zones B33, B31 and B35. For example, the processing circuit 302 may perform a curve fitting operation on the target uniformities of the backlight zones B33, B31 and B35 based on the equation F1 to obtain the target uniformities of the backlight zones B32 and B34. As shown in FIG. 6, C1 represents the curve of equation F1. In an embodiment, the curve C1 may be a curve of the equation F1 of a normal distribution, but not limited thereto.

Moreover, please further refer to FIG. 6, the processing circuit 302 obtains the target uniformities of the backlight zones (i.e., backlight zones B13 and B53) on both side edges of the zone column BC3 including the central backlight zone B33 and the target uniformity of the backlight zone B33. The processing circuit 302 may perform a curve fitting operation on the target uniformities of the backlight zones B33, B13 and B53 based on an equation F2 to obtain the target uniformities of the backlight zones B23 and B43. As shown in FIG. 6, C2 represents the curve of equation F2. In an embodiment, the curve C2 maybe a curve of the equation F2 of a normal distribution, but not limited thereto. As a result, the processing circuit 302 may set the target uniformities of the backlight zones of the zone row BR3 and the zone column BC3 including the central backlight zone B33. Similarly, the processing circuit 302 may set the target uniformities of the backlight zones of each zone row and zone column of the surface light-emitting device 20. Regarding the central backlight zone located at the intersection of the zone row BR3 and the zone column BC3. The target uniformity of the central backlight zone is the same value whether in the curve C1 or curve C2 so as to ensure that the brightness of the backlight zone in the middle is designed to achieve the maximum brightness and the brightness of the backlight zones in the surrounding decreases according to the equations F1 and F2. In addition, when the equations F1 and F2 are normally distributed, the brightness of the backlight zones in the surrounding may be decreased in a smooth manner without dropping rapidly and sharply.

Figure 7:
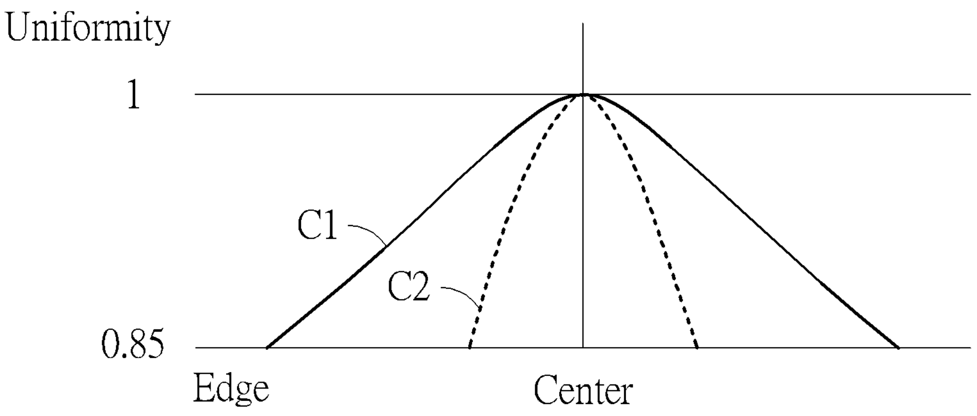
FIG. 7 is a schematic diagram illustrating curves of curve fitting operation for the surface light-emitting device with an aspect ratio according to embodiments of the present invention.

When applied to the surface light-emitting device 20 with an aspect ratio, a backlight zone located at or near a center of the surface light-emitting device 20 and located at an intersection of a zone row and a zone column may be defined as a central backlight zone. A maximum distance between the backlight zone closest to the edge among the plurality of zone rows of the surface light-emitting device 20 and the central backlight zone maybe greater than a maximum distance between the backlight zone closest to the edge among the plurality of zone columns of the surface light-emitting device 20 and the central backlight zone. Moreover, an adjustment value corresponding to the backlight zone closest to the edge among the plurality of zone rows may be greater than an adjustment value corresponding to the backlight zone closest to the edge among the plurality of zone columns. In other words, the zone rows are arranged along the short axis direction, and the zone columns are arranged along the long axis direction. Please refer to FIG. 7. FIG. 7 is a schematic diagram illustrating curves C1 and C2 of curve fitting operation for the surface light-emitting device 20 with the aspect ratio according to embodiments of the present invention. The number of zone columns is greater than the number of zone rows. As shown in FIG. 7, the curve C1 may lie across more zone columns and the distance between the edge backlight zone and the central backlight zone is longer, the brightness need not be rapidly increased from low brightness of the edge backlight zone to high brightness of the central backlight zone, such that the curve C1 rises from the edge backlight zone toward the central backlight zone with a smaller (flatter) curvature. As shown in FIG. 7, the curve C2 may lie across less zone rows and the distance between the edge backlight zone and the central backlight zone is shorter, the brightness need be rapidly increased from low brightness of the edge backlight zone to high brightness of the central backlight zone, such that the curve C2 rises from the edge backlight zone toward the central backlight zone with a larger (steeper) curvature.

For the surface light-emitting device 20 with an aspect ratio, the uniformities of the backlight zones (except central backlight zone and edge backlight zones) on the same zone row may be determined by using the curve C1 with a smaller (flatter) curvature and the corresponding equation F1 based on the uniformities of the central backlight zone and the edge backlight zones. The uniformities of the backlight zones (except central backlight zone and edge backlight zones) on the same zone column may be determined by performing a curve fitting operation according to the uniformities of the central backlight zone and the edge backlight zones on the same zone column. The result of curve fitting is the curve C2 with larger (steeper) curvature. Therefore, when the surface light-emitting device 20 is designed with an aspect ratio of 16:9 or 16:10, the surface light-emitting device 20 may offer a gentle change of uniformity in the direction of horizontal long axis for the user, which is suitable for all types of products with large viewing angles, such as televisions, displays, notebooks and vehicle-mounted devices.

In Step S308, the processing circuit 302 generates a plurality of adjustment values according to the plurality of uniformities, the plurality of target uniformities and a plurality of adjustment coefficients corresponding to the plurality of backlight zones. For example, the backlight zones of each zone row correspond to a corresponding adjustment coefficient. The plurality of adjustment coefficients may be different. The plurality of adjustment values corresponding to the backlight zones of the surface light-emitting device 20 may be calculated by the processing circuit 302 according to the following equation:

$$A_{i,k} = \left(\frac{UT_{i,k}}{U_{i,k}}\right)^{G_K} \quad (1)$$

where $A_{i,k}$ represents an adjustment value of i-th backlight zone of k-th first group, $UT_{i,k}$ represents a target uniformity of the i-th backlight zone of the k-th first group, $U_{i,k}$ represents a uniformity of the i-th backlight zone of the k-th first group, $G_k$ represents an adjustment coefficient corresponding to the k-th first group, and i is between 1 and m, k is between 1 and n, $G_k$ is a real number.

Please further refer to FIG. 4 and FIG. 5. The adjustment coefficients G1 to G5 correspond to the zone rows BR1 to BR5. The processing circuit 302 may calculate a uniformity ratio by dividing a target uniformity of a backlight zone of each zone row by a uniformity of the backlight zone, and perform an exponentiation operation on the uniformity ratio with a power of the corresponding adjustment coefficient to generate an adjustment value corresponding to the backlight zone of the zone row. For example, for zone row BR1, the adjustment value of each backlight zone in the zone row BR1 may be calculated by the processing circuit 302 according to the following equation:

$$A_{i,1} = \left(\frac{UT_{i,1}}{U_{i,1}}\right)^{G_1} \quad (2)$$

where $A_{i,1}$ represents an adjustment value of i-th backlight zone of zone row BR1, $UT_{i,1}$ represents a target uniformity of the i-th backlight zone of the zone row BR1, $U_{i,1}$ represents a uniformity of the i-th backlight zone of the zone row BR1, $G_1$ represents an adjustment coefficient corresponding to the zone row BR1, and i is between 1 and m.

The operations of generating the adjustment values of the backlight zones of zone rows BR2 to BR5 are similar or identical to those operations of generating the adjustment value of the backlight zones of the zone row BR1 illustrated above, and further description is omitted here for brevity. Therefore, the processing circuit 302 may calculate the adjustment values of all backlight zones of the surface light-emitting device 20. Moreover, since the adjustment coefficient is a power (or called exponent) term of the exponential equation, the change of the adjustment value may increase exponentially in response to the adjustment coefficient, rather than increase linearly. When the uniformity ratio of the backlight zone is greater than one, the adjustment value may be increased rapidly and accordingly the corresponding current for driving the backlight zone maybe increased so as to improve the brightness of the backlight zone.

Regarding the method of determining the adjustment coefficient, please refer to FIG. 6. The adjustment coefficient G3 may be determined according to the curve C1. For example, the adjustment coefficient G3 is the curvature of the curve C1. For the zone columns BC1 to BC5, taking the zone column BC3 for example, the adjustment coefficient of the zone column BC3 may be the curvature of the curve C2. Further, when the surface light-emitting device 20 is a square as shown in FIG. 6, the curvatures of the curves C1 and C2 are the same. When the surface light-emitting device is a rectangle as shown in FIG. 7, the curvature of the curve C1 on the long axis is smaller than the curvature of the curve C2 on the short axis.

The backlight zones of each zone row correspond to a corresponding adjustment coefficient. The plurality of adjustment coefficients are real numbers. The plurality of adjustment coefficients may be different. For example, the adjustment coefficient G1 is different from the adjustment coefficient G2. A backlight zone located at or near a center of the surface light-emitting device 20 and located at an intersection of a zone row and a zone column may be defined as a central backlight zone. For example, please further refer to FIG. 6, the backlight zone B33 may be a central backlight zone. As a minimum distance between the backlight zone of a first zone row of the plurality of zone rows of the surface light-emitting device 20 and the central backlight zone is smaller than a minimum distance between the backlight zone of a second zone row of the plurality of zone rows of the surface light-emitting device 20 and the central backlight zone, the adjustment coefficient corresponding to the backlight zones of the first zone row of the plurality of zone rows is greater than the adjustment coefficient corresponding to the backlight zones of the second zone row of the plurality of zone rows.

For example, please further refer to FIG. 4 to FIG. 6, the backlight zone B33 is the central backlight zone. A minimum distance L1 between the zone row BR1 and the backlight zone B33 is two backlight zones (i.e., the vertical distance between the zone row BR1 and the backlight zone B33). A minimum distance L2 between the zone row BR2 and the backlight zone B33 is one backlight zone (i.e., the vertical distance between the zone row BR2 and the backlight zone B33). As such, the adjustment coefficient G2 corresponding to the zone row BR2 is greater than the adjustment coefficient G1 corresponding to the zone row BR1.

Figure 13:
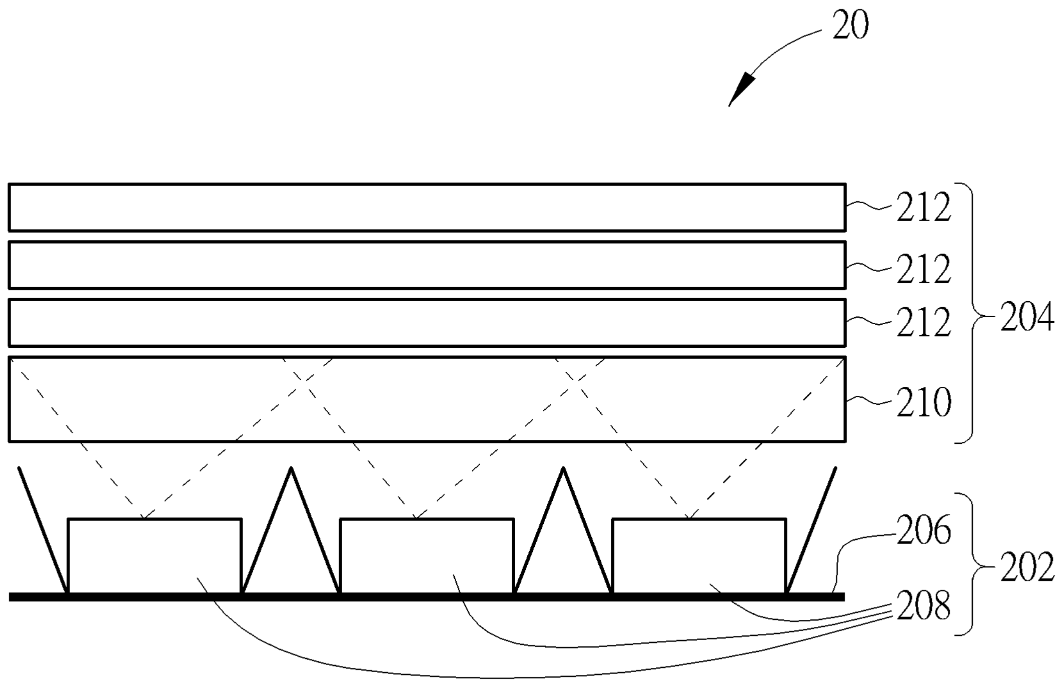
FIG. 13 is a schematic diagram of the surface light-emitting device shown in FIG. 1 according to an alternative embodiment of the present invention.
Figure 14:
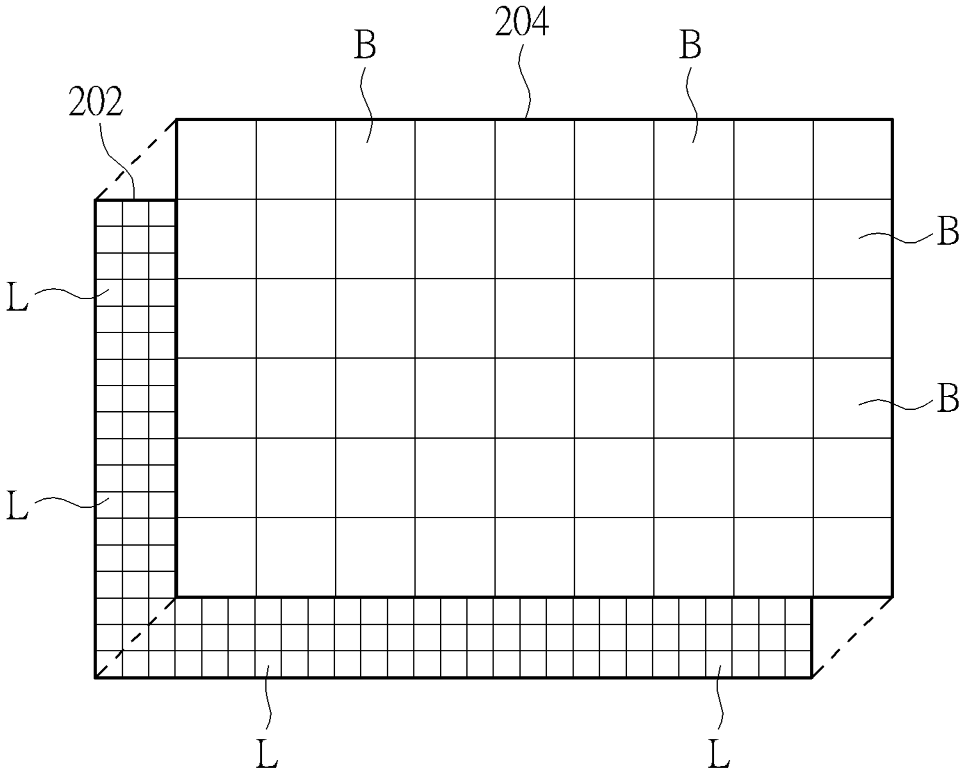
FIG. 14 is a schematic diagram illustrating the relationship of the backlight zones and the light-emitting zones according to an embodiment of the present invention.

Please refer to FIG. 13, which is a schematic diagram of the surface light-emitting device 20 according to an alternative embodiment of the present invention. The surface light-emitting device 20 includes a light source module 202 and a backlight module 204. The light source module 202 includes a substrate 206 and a plurality of light sources 208 disposed on the substrate 206. The backlight module 204 includes a diffusion plate 210 and an optical film 212. The light source 208 is utilized for emitting light. For example, the light source 208 may be realized with a light-emitting diode (LED), a mini LED or any other device capable of emitting light. The light emitted by the light source 208 illuminates the display panel 10. Please refer to FIG. 14. The light source module 202 defines a plurality of light-emitting zones L. Each light-emitting zone L includes at least one light source 208. The number of the plurality of light-emitting zones L is greater than or equal to the number of the plurality of backlight zones B. The light source module 202 is arranged below the backlight module 204. A purpose of embodiments is that the closer to the edge the light source 208 is, the less the brightness is affected. That is, the closer to the edge the triangle dashed range shown in FIG. 13 is, the less the light is. As such, the response is flatter, and a smaller adjustment coefficient may be used. Alternatively, the closer to the center the light source 208 is, the larger the brightness is affected. The light may overlap each other in the center area of the triangle dashed range shown in FIG. 13, and a larger adjustment coefficient may be used. Therefore, the embodiments may fine-tune the uniformity or brightness of the backlight zones at different positions according to the actual brightness, and thus effectively optimizing the brightness distribution performance of the surface light-emitting device 20 and significantly improving the problem of uneven brightness.

In Step S310, the driving circuit 306 generates a plurality of adjusted driving currents to drive the plurality of backlight zones according to the plurality of adjustment values and the plurality of driving currents. The processing circuit 302 calculates the plurality of adjusted driving currents according to the adjustment values generated by Step S308 and the driving currents generated by Step S302. Accordingly, the driving circuit 306 generates the plurality of adjusted driving currents to drive the plurality of backlight zones of the surface light-emitting device 20. For each backlight zone, the driving circuit 306 generates an adjusted driving current corresponding to the each backlight zone. The adjusted driving current corresponding to the each backlight zone may be a product of an adjustment value corresponding to the each backlight zone and a driving current corresponding to the each backlight zone. For example, the adjusted driving current of each backlight zone may be calculated by the processing circuit 302 according to the following equation:

$$I'_{i,k}=A_{i,k}\times I_{i,k} \quad (3)$$

where $I'_{i,k}$ represents an adjusted driving current of i-th backlight zone of k-th zone row ($BR_k$), $A_{i,k}$ represents an adjustment value of the i-th backlight zone of the k-th zone row, $I_{i,k}$ represents an original driving current (e.g., driving current used in Step S302) of the i-th backlight zone of the k-th zone row, and i is between 1 and m, k is between 1 and n.

As shown in FIG. 13, the dashed line represents the light path. Due to the light emission angle of the light source 208, it may easy to cause light overlap and higher brightness in the backlight zones at the inner portion of the surface light-emitting device 20. For the backlight zones at the outer edge of the surface light-emitting device 20, the emitted light may be concentrated to one side and the brightness may be lower. Moreover, the backlight zones at four corners of the surface light-emitting device 20 may have the lowest brightness due to the lack of light reinforcement from adjacent backlight zones. Therefore, the processing circuit 302 calculates the adjusted driving current of each backlight zone. The driving circuit 306 generates the adjusted driving current of each backlight zone to drive each backlight zone of the surface light-emitting device 20. As shown in FIG. 8, the number in each backlight zone represents the adjusted drive current corresponding to the each backlight zone, in milliamps. In other words, the embodiments of the present invention generate the adjusted driving current by utilizing the corresponding adjustment coefficient and adjustment value, especially for the numerical compensation of the driving current for the backlight zones closer to the edge and the four corners of the surface light-emitting device 20, and thus improving the display uniformity, providing the brightness compensation of the dark area and the appearance compensation of the overall light-emitting surface, effectively optimizing the brightness distribution of the surface light-emitting device 20 and improving the problem of uneven brightness. Moreover, the curve of the adjusted driving currents of the embodiments of the present invention may be smoother and the overall power consumption may be effectively reduced.

Moreover, please refer to FIG. 8. The adjusted driving currents calculated and generated by the processing circuit 302 and driving circuit 306 may be utilized for driving the light sources in the backlight zones of the surface light-emitting device 20. The closer to the outer edge of the surface light-emitting device 20 the backlight zone is, the larger the adjusted driving current corresponding to the backlight zone is. The closer to the inner of the surface light-emitting device 20 the backlight zone is, the smaller the adjusted driving current corresponding to the backlight zone is. As a result, the backlight control circuit 30 of the embodiments may generate the adjusted driving currents to drive the surface light-emitting device 20 according to the above-mentioned method, and thus effectively optimizing the brightness distribution and significantly improving the problem of uneven brightness. For example, the surface light-emitting device 20 may be divided into a plurality of backlight areas. Each backlight area includes at least one backlight zone. The outer backlight area is closer to the edge of the surface light-emitting device 20 than the internal backlight area. The internal backlight area is closer to the center of the surface light emitting device 20 than the outer backlight area. The adjusted driving current generated by the driving circuit 306 for driving the outer backlight area (e.g., current for driving the backlight zone at the intersection of zone column BC5 and zone row BR3 is 32.049 mA) may be greater than the adjusted driving current generated by the driving circuit 306 for driving the internal backlight area (e.g., current for driving the backlight zone at the intersection of zone column BC3 and zone row BR3 is 26.359 mA or current for driving the backlight zone at the intersection of zone column BC4 and zone row BR3 is 25.44 mA). Since the conventional display apparatus using the backlight control circuit with constant current dimming usually has the problems of peripheral dark bands and low contrast. The embodiments of the present invention provide the backlight control circuit to generate the adjusted driving currents to drive the surface light-emitting device 20. The closer to the outer edge of the surface light-emitting device 20 the backlight zone is, the larger the adjusted driving current corresponding to the backlight zone of the embodiment is. The closer to the inner of the surface light-emitting device 20 the backlight zone is, the smaller the adjusted driving current corresponding to the backlight zone of the embodiment is, and thus effectively optimizing the brightness distribution performance of the surface light-emitting device 20 and significantly improving the problem of uneven brightness. In addition, it should be noted that the current utilized for driving the backlight zone of the surface light-emitting device 20 is the driving current. The driving current maybe referred to by different names, such as driving current, pre-driving current, original driving current and adjusted driving current, and these names are different descriptions under different conditions. In particular, the above-mentioned driving current is for illustration only and should not be used to limit the scope of the present invention.

Figure 9:
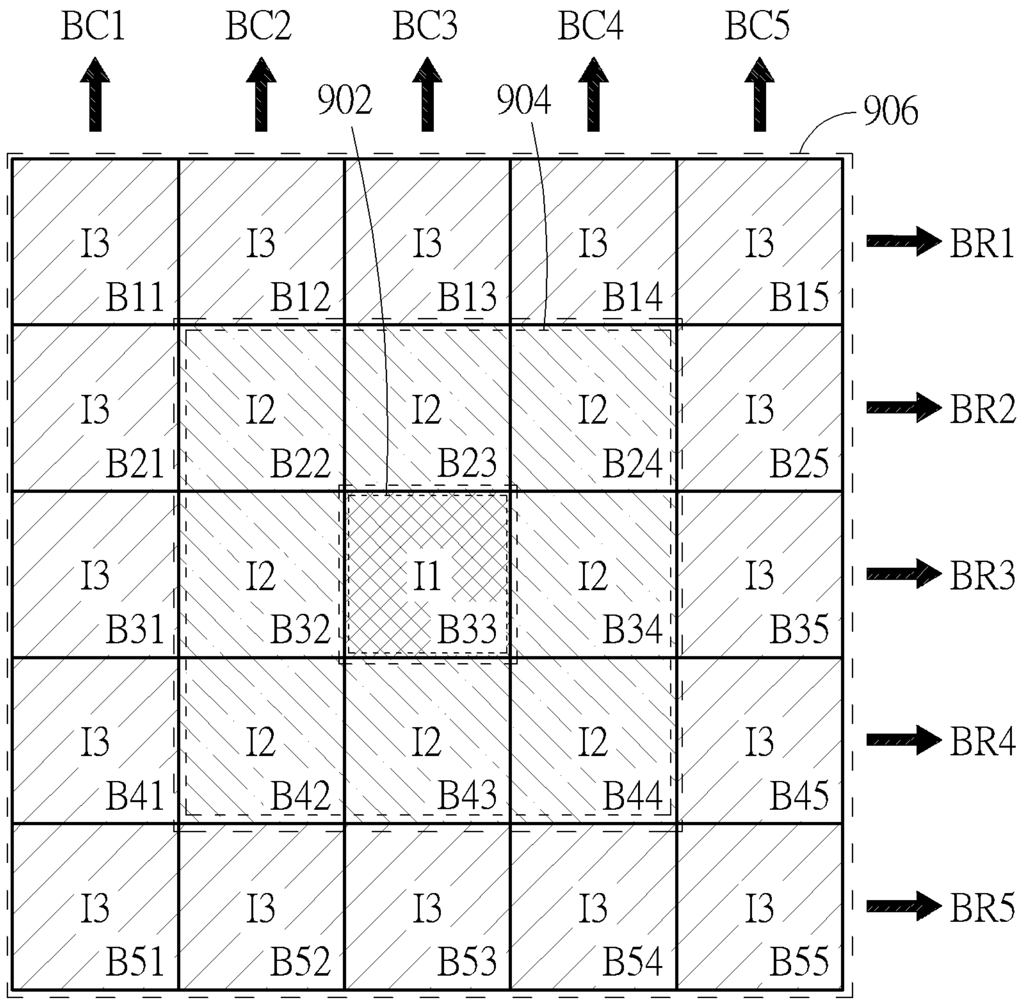

In some embodiments, as shown in FIG. 9, the surface light-emitting device 20 may be divided into backlight areas 902, 904 and 906. Among the backlight areas 902, 904 and 906, the backlight area 902 may be an internal backlight area (e.g., called first backlight area), and the backlight areas 904 and 906 may be outer backlight areas (e.g., collectively called second backlight area). The backlight area 904 surrounds the backlight area 902, and the backlight area 906 surrounds backlight area 904. Similarly, regarding the backlight areas 904 and 906, the backlight area 904 may be an internal backlight area (e.g., called second backlight area), and the backlight area 906 may be an outer backlight area (e.g., called third backlight area). As such, the backlight area 904 may be determined as an internal backlight area or an outer backlight area based on its related location. In more detail, the backlight area 902 includes the backlight zone B33. The backlight area 904 includes the backlight zones B22 to B24, B32, B34 and B42 to B44. The backlight area 906 includes the backlight zones B11 to B15, B21, B25, B31, B35, B41, B45 and B51 to B55. The driving circuit 306 generates an adjusted driving current I1 to drive the light sources of the backlight zones of the backlight area 902. The driving circuit 306 generates an adjusted driving current I2 to drive the light sources of the backlight zones of the backlight area 904. The driving circuit 306 generates an adjusted driving current I3 to drive the light sources of the backlight zones of the backlight area 906. The adjusted driving current I2 may be greater than the adjusted driving current I1. The adjusted driving current I3 may be greater than the adjusted driving currents I1 and I2. For example, the adjusted driving current I1 is 1 mA, the adjusted driving current I2 is 2 mA, and the adjusted driving current I3 is 3 mA, but not limited thereto. In addition, the internal backlight area may include the central backlight zone of the surface light emitting device 20. For example, backlight area 902 includes the backlight zone B33 (i.e., central backlight zone). The outer backlight area may include at least one backlight zone located at the outermost edge of the surface light emitting device 20. For example, as shown in FIG. 9, the backlight area 906 includes the backlight zones at the first and last columns of the surface light-emitting device 20 and the backlight blocks at the first and last rows.

Figure 10:
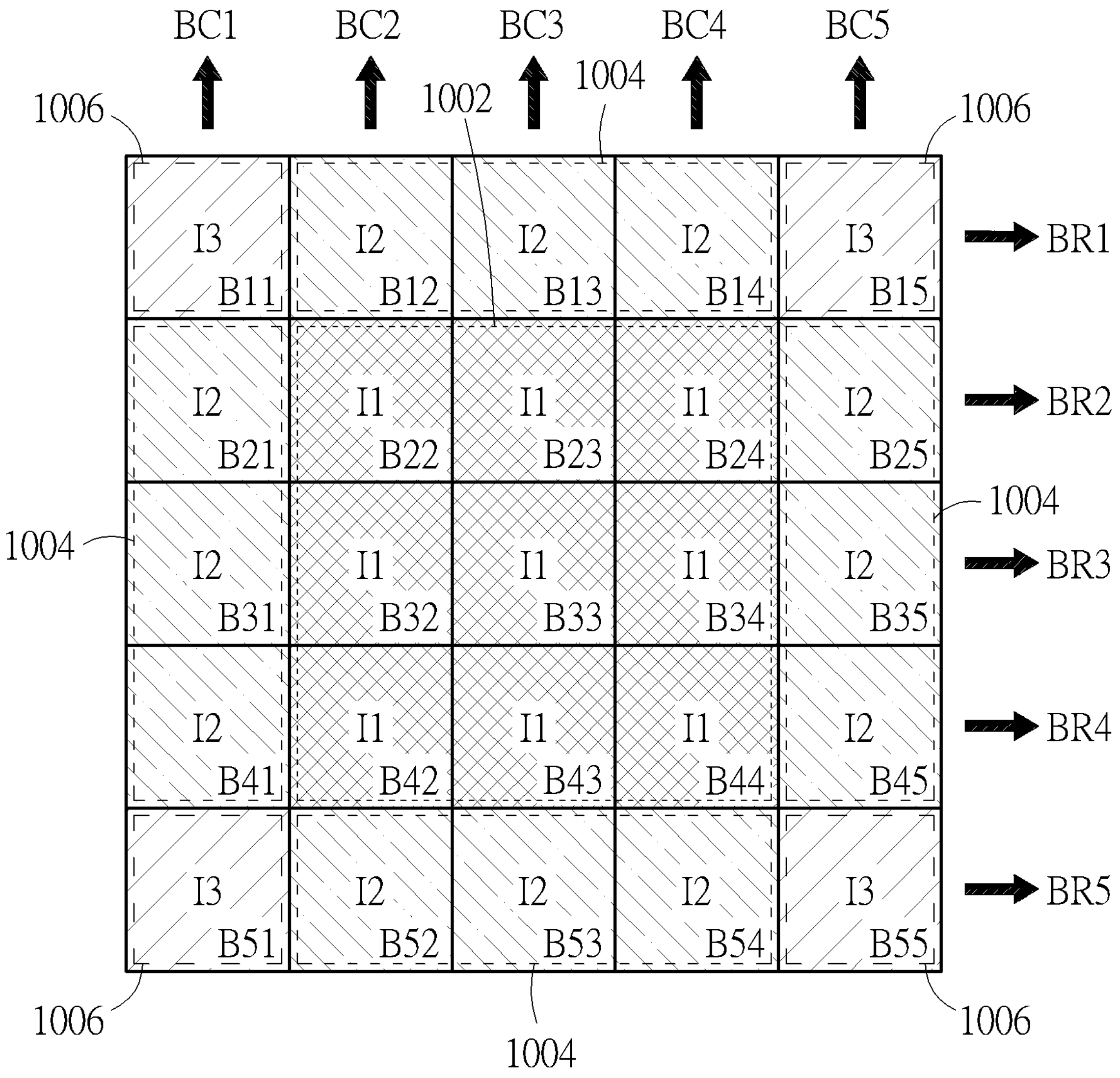

In some embodiments, the adjusted driving currents calculated and generated by the processing circuit 302 and driving circuit 306 may be utilized for driving the light sources in the backlight zones of the surface light-emitting device 20. The closer to the outer edge of the surface light-emitting device 20 the backlight zone is, the larger the adjusted driving current corresponding to the backlight zone is. The closer to the inner of the surface light-emitting device 20 the backlight zone is, the smaller the adjusted driving current corresponding to the backlight zone is. Moreover, the adjusted driving current corresponding to at least one corner backlight zone may be the maximum adjusted driving current. The corner backlight zones, which may be called third backlight area, are the backlight zones located at the corners of the surface light-emitting device 20. For example, as shown in FIG. 10, the surface light-emitting device 20 is quadrangular, and the corner backlight zones are located at four corners of the surface light-emitting device 20. In more detail, the surface light-emitting device 20 may be divided into backlight areas 1002, 1004 and 1006. The backlight area 1002 may be an internal backlight area. The backlight area 1004 may be an outer backlight area. The backlight area 1004 surrounds the backlight area 1002. The backlight area 1002 includes the backlight zones B22 to B24, B32 to B34 and B42 to B44. The backlight area 1004 includes the backlight zones B12 to B14, B21, B25, B31, B35, B41, B45 and B52 to B55. The backlight area 1006 includes the backlight zones B11, B15, B51 and B55. The driving circuit 306 generates the adjusted driving current I1 to drive the light sources of the backlight zones of the backlight area 1002. The driving circuit 306 generates the adjusted driving current I2 to drive the light sources of the backlight zones of the backlight area 1004. The driving circuit 306 generates the adjusted driving current I3 to drive the light sources of the backlight zones of the backlight area 1006. The adjusted driving current I2 may be greater than the adjusted driving current I1. The adjusted driving current I3 may be greater than the adjusted driving currents I1 and I2. As shown in FIG. 10, the adjusted driving current for driving the corner backlight zones of the surface light emitting device 20 is greater than the adjusted driving current for driving other backlight blocks. For example, the adjusted driving current I1 is 1 mA, the adjusted driving current I2 is 2 mA, and the adjusted driving current I3 is 3 mA, but not limited thereto. Please note that, the corner backlight zones (e.g., backlight zones of the backlight area 1006) may utilize multiple light sources 208 connected in a parallel connection, so that the total current of the corner backlight zones is higher. The other backlight zones except the corner backlight zones (e.g., backlight zones of the backlight areas 1002 and 1004) may utilize a single light source 208 respectively, and the total current of the other backlight zones is lower. Therefore, the embodiments of the present invention perform a greater degree of current compensation for the four corners of the surface light-emitting device 20 where the brightness is most insufficient, so as to improve the problem of uneven brightness effectively. In other words, the embodiments of the present invention generate the adjusted driving current by utilizing the corresponding adjustment coefficient and adjustment value, thus effectively optimizing the brightness distribution of the surface light-emitting device 20 and improving the problem of uneven brightness.

Figure 11:
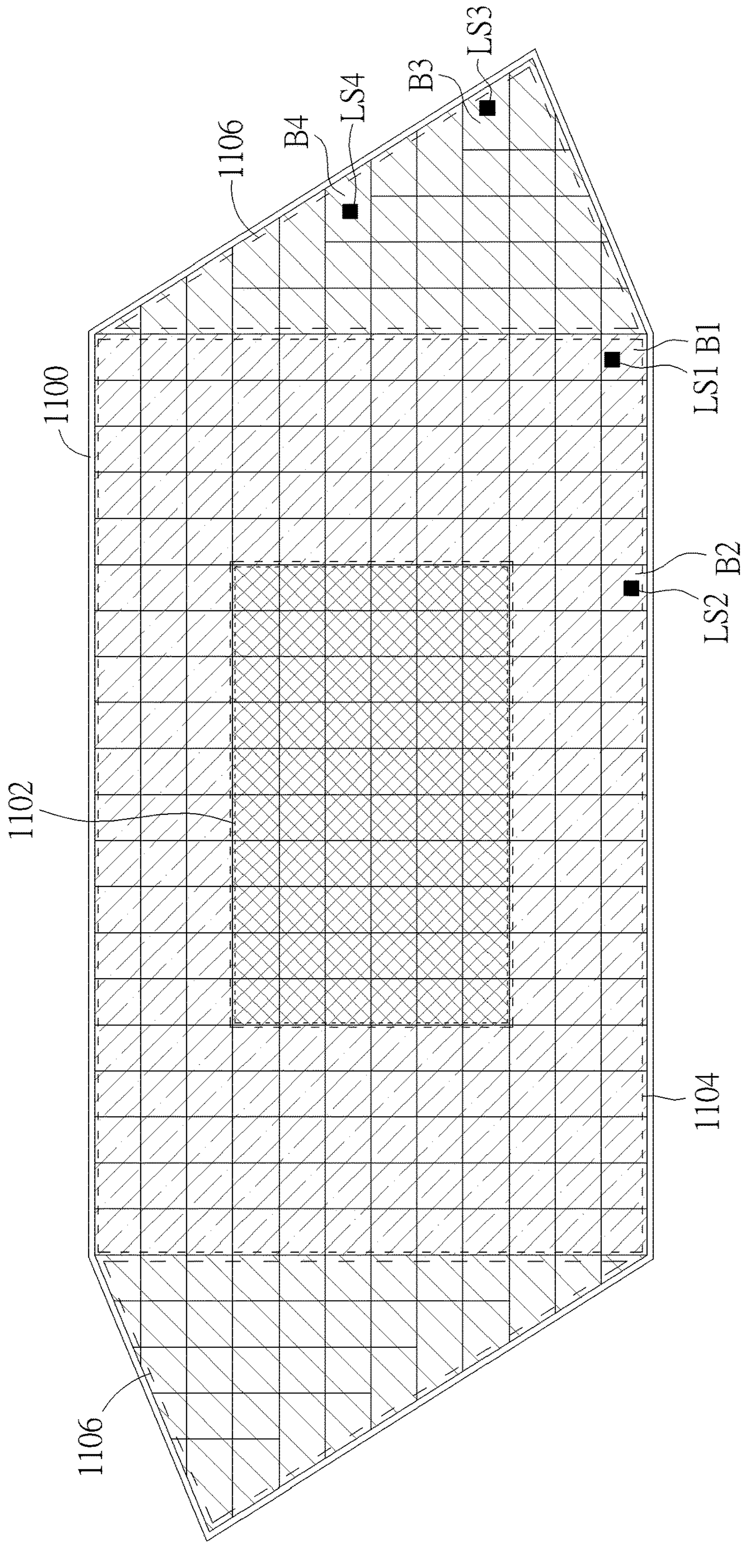

In some embodiments, as shown in FIG. 11, the surface light-emitting device 20 may be divided into backlight areas 1102, 1104 and 1106. The backlight area 1102 may be an internal backlight area (e.g., called first backlight area), and the backlight areas 1104 and 1106 may be outer backlight areas (e.g., called second backlight area and third backlight area, respectively). The backlight areas 1104 and the backlight area 1106 form a polygon. The adjusted driving current for driving the backlight zones of the backlight area 1106 is greater than the adjusted driving current for driving the backlight zones of the backlight area 1104. The adjusted driving current for driving the backlight zones of the backlight area 1104 is greater than the adjusted driving current for driving the backlight zones of the backlight area 1102. For example, the backlight area 1104 includes backlight zones B1 and B2. The backlight area 1106 includes the backlight zones B3 and B4. The driving circuit 306 generates the adjusted driving current I1 to drive the light sources of the backlight zone B1 of the backlight area 1104. The driving circuit 306 generates the adjusted driving current I2 to drive the light sources of the backlight zone B2 of the backlight area 1104. The driving circuit 306 generates the adjusted driving current I3 to drive the light sources of the backlight zone B3 of the backlight area 1106. The driving circuit 306 generates the adjusted driving current I4 to drive the light sources of the backlight zone B4 of the backlight area 1106. The relationship of the adjusted driving current I1 to I4 may be expressed as follows: I4>I3>I1>I2. That is, the adjusted driving current (e.g., I3, I4) for driving the backlight zone of the backlight area 1106 is greater than the adjusted driving current (e.g., I1, I2) for driving the backlight zone of the backlight area 1104.

On the other hand, as shown in FIG. 11, the surface light-emitting device 20 further includes an outer frame 1100. The outer frame 1100 surrounds the backlight zones of the surface light-emitting device 20. Among the light-emitting zones arranged below the backlight zones on the same edge, the driving current utilized for driving the light-emitting diodes farther from the outer frame 1100 is greater than the driving current utilized for driving the light-emitting diodes closer to the outer frame 1100. For example, as shown in FIG. 11, the backlight zones B1 and B2 in the backlight area 1104 are located at the same edge, the distance between the light-emitting diode LS1 of the backlight zone B1 and the outer frame 1100 is greater than the distance between the light-emitting diode LS2 of the backlight zone B2 and the outer frame 1100. That is, the light-emitting diode LS1 of the backlight zone B1 is farther from the outer frame 1100, and the light-emitting diode LS2 of the backlight zone B2 is closer to the outer frame 1100. The adjusted driving current I1 for driving the light-emitting diode LS1 of the backlight zone B1 is greater than adjusted driving current I2 for driving the light-emitting diode LS2 of the backlight zone B2. The backlight zones B3 and B4 in the backlight area 1106 are located at the same edge, the distance between the light-emitting diode LS4 of the backlight zone B4 and the outer frame 1100 is greater than the distance between the light-emitting diode LS3 of the backlight zone B3 and the outer frame 1100. The light-emitting diode LS4 of the backlight zone B4 is farther from the outer frame 1100, and the light-emitting diode LS3 of the backlight zone B3 is closer to the outer frame 1100. As such, the adjusted driving current I4 for driving the light-emitting diode LS4 of the backlight zone B4 is greater than adjusted driving current I3 for driving the light-emitting diode LS3 of the backlight zone B3.

Figure 12:
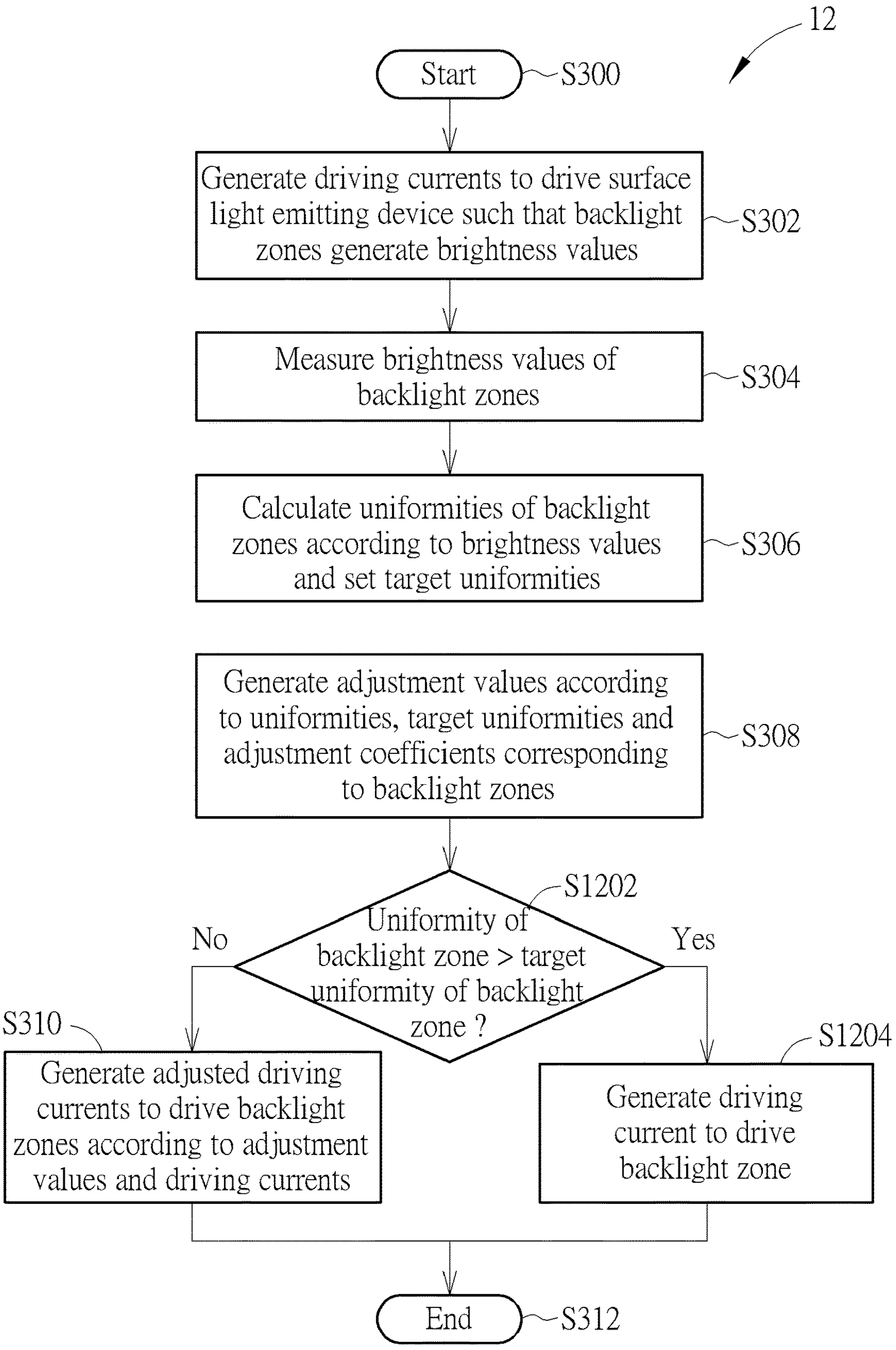
FIG. 12 is a flow diagram of a procedure according to a second embodiment of the present invention.

In another embodiment, please refer to FIG. 12. FIG. 12 is a flow diagram of a procedure 12 according to an embodiment of the present invention. Please note that the steps in the procedure 12 shown in FIG. 12 with the same steps numbers or designations as those in the procedure 3 shown in FIG. 3 have similar operations and functions, and further description thereof is omitted for brevity. As shown in FIG. 12, after Step S308, Step S1202 is executed. In Step S1202, the processing circuit 302 further determines whether the uniformity of each backlight zone is greater than the target uniformity of the each backlight zone. When the uniformity of the backlight zone is greater than the target uniformity of the each backlight zone (i.e., the uniformity ratio is smaller than one), Step S310 is not executed, the driving circuit 306 does not perform the step of generating the adjusted driving current for the backlight zone. This means, the backlight zone has sufficient brightness without decreasing the current value of the backlight zone to reduce the brightness of the backlight zone. For example, when the uniformity of the backlight zone is greater than the target uniformity of the backlight zone, Step S1204 is executed, and the driving circuit 306 generates the driving current to drive the backlight zone. Step S1204 is similar to Step S302. Therefore, for a backlight zone having the uniformity greater than the target uniformity, the driving circuit 306 generates an original driving current to drive the backlight zone without adjustment. For example, when the uniformity of the backlight zone is smaller than or equal to the target uniformity of the backlight zone (i.e., the uniformity ratio is greater than or equal to one), Step S310 is executed, the driving circuit 306 generates an adjusted driving current to drive the backlight zone. Since the adjustment coefficient is a power term of the exponential equation, the change of the adjustment value may increase exponentially in response to the adjustment coefficient, rather than increase linearly. When the uniformity ratio of the backlight zone is greater than one, the adjustment value may be increased rapidly and the current for driving the backlight zone may be increased accordingly so as to improve the brightness of the backlight zone.

Figure 15:
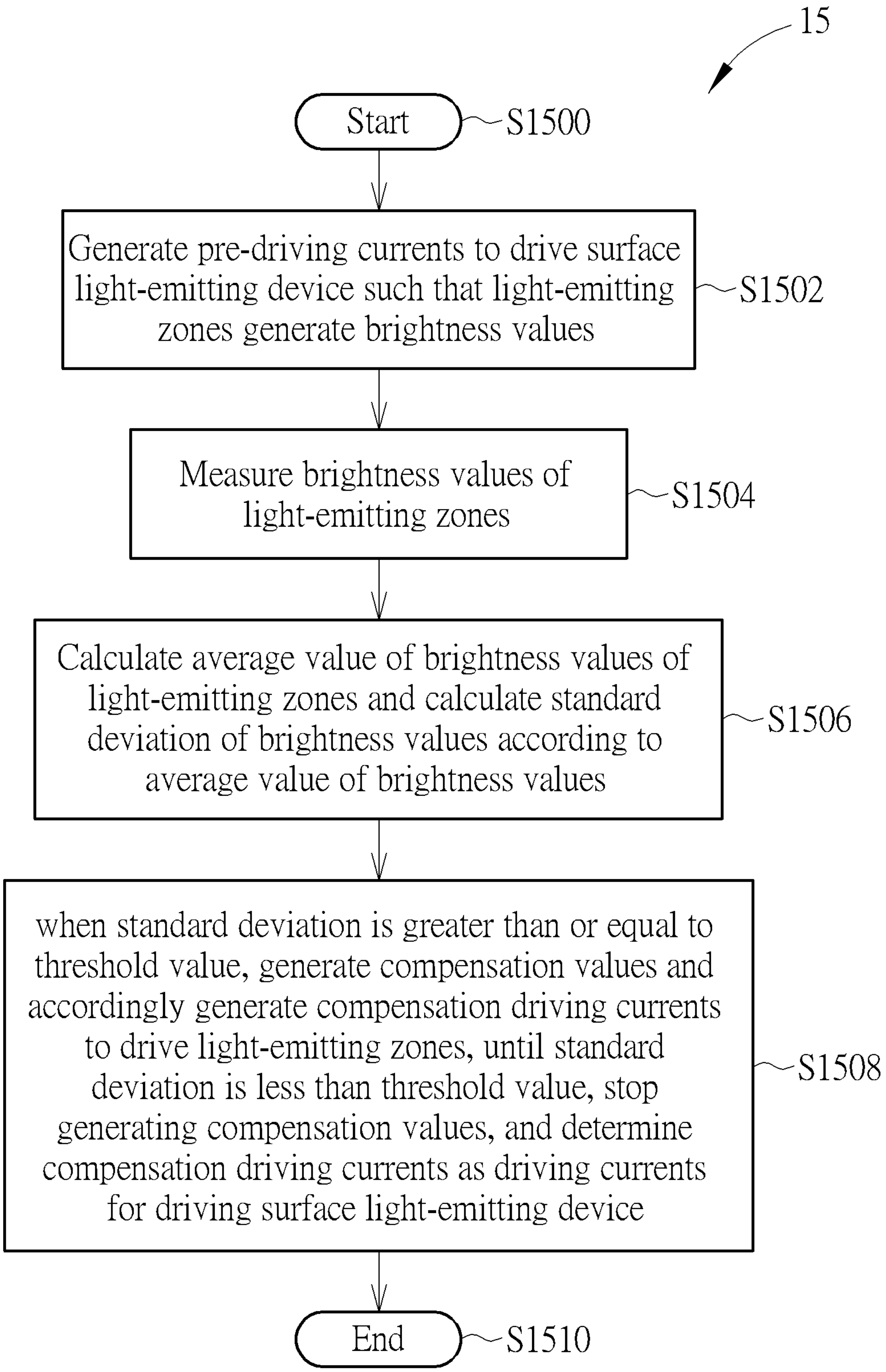
FIG. 15 is a flow diagram of a procedure according to a third embodiment of the present invention.

The procedure 3 shown in FIG. 3 may be applied based on the premise that the light source module 202 emits light uniformly. As the light source module 202 emits the light unevenly, the light source module 202 has to be corrected first in order to provide uniform illumination. Further description associated with the operations of calibrating the light source module 202 for uniform illumination is provided as follows. Please refer to FIG. 15. FIG. 15 is a flow diagram of a procedure 15 according to an embodiment of the present invention. The procedure 15 includes the following steps:

Step S1500: Start.

Step S1502: Generate a plurality of pre-driving currents to drive the surface light-emitting device such that a plurality of light-emitting zones generates a plurality of brightness values.

Step S1504: Measure the plurality of brightness values of the plurality of light-emitting zones.

Step S1506: Calculate an average value of the plurality of brightness values of the plurality of light-emitting zones and calculate a standard deviation of the plurality of brightness values according to the average value of the plurality of brightness values.

Step S1508: When the standard deviation is greater than or equal to a threshold value, generate a plurality of compensation values and accordingly generate a plurality of compensation driving currents to drive the plurality of light-emitting zones, until the standard deviation is less than the threshold value, stop generating the plurality of compensation values, and determine the plurality of compensation driving currents as the plurality of driving currents for driving the surface light-emitting device.

Step S1510: End.

According to the procedure 15, in Step S1502, the driving circuit 306 generates a plurality of pre-driving currents to drive the surface light-emitting device 20 such that the plurality of light-emitting zones of the surface light-emitting device 20 generate the plurality of brightness values. In Step S1504, the measurement circuit 304 measures the plurality of brightness values of the plurality of light-emitting zones in the surface light-emitting device 20. In Step S1506, the processing circuit 302 calculates an average value of the plurality of brightness values generated by the plurality of light-emitting zones of the light source module 202, and calculates a standard deviation of the plurality of brightness values according to the average value of the plurality of brightness values. In Step S1508, when the standard deviation is greater than or equal to a threshold value, the processing circuit 302 generates a plurality of compensation values, and combines and converts the plurality of compensation values and the plurality of pre-driving currents into a plurality of compensation driving currents. As such, the driving circuit 306 generates the plurality of compensation driving currents to drive the plurality of light-emitting zones of the surface light-emitting device 20 so as to improve the bright area and the dark area to meet the standard requirement and solve the problem that the bright area is too bright and the dark area is too dark. Until the standard deviation is less than the threshold value, the processing circuit 302 stops generating the plurality of compensation values, and determines the plurality of compensation driving currents for acting as the plurality of driving currents generated by the step S302 in the procedure 3. The procedure 15 may be applied to obtain a plurality of driving currents before the procedure 3 is executed so as to meet the requirement of uniform brightness more quickly and effectively.

Those skilled in the art should readily make combinations, modifications and/or alterations on the above-mentioned description and examples. The above-mentioned descriptions, steps, procedures and/or processes including suggested steps may be realized by means that could be hardware, software, firmware (known as a combination of a hardware device and computer instructions and data that reside as read-only software on the hardware device), an electronic system, or combination thereof. Examples of hardware may include analog, digital and mixed circuit s known as microcircuit, microchip, or silicon chip. Examples of the electronic system may include a system on chip (SoC), a system in package (SiP), a computer on module (CoM) and the display apparatus 1. Any of the above-mentioned procedures and examples above maybe compiled into program codes or instructions that are stored in a storage device. The storage device may include a computer-readable storage medium. The storage device may include read-only memory (ROM), flash memory, random access memory (RAM), subscriber identity module (SIM), hard disk, floppy diskette, or CD-ROM/DVD-ROM/BD-ROM, but not limited thereto. The processing circuit 302 may read and execute the program codes or the instructions stored in the storage device for realizing the above-mentioned functions. The processing circuit 302 may be a central processing unit (CPU), a microprocessor, a digital signal processor (DSP), a programmable controller, a graphics processing unit (GPU), a programmable logic device (PLD) or other similar devices or combination of these devices, but not limited thereto.

In summary, the conventional display apparatus using the backlight control circuit with constant current dimming usually has the problems of uneven brightness (e.g., obvious grid mura), peripheral dark bands and low contrast. In comparison, the embodiments of the present invention provides the backlight control circuit to generate the adjusted driving currents to drive the surface light-emitting device 20, and thus improving the display uniformity, realizing the brightness compensation of the dark area and the appearance compensation of the overall light-emitting surface, effectively optimizing the brightness distribution of the surface light-emitting device 20 and significantly improving uneven brightness and contrast, and effectively reducing the power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight control circuit for driving a surface light-emitting device, comprising:

a driving circuit configured to generate a plurality of driving currents to drive the surface light-emitting device such that a plurality of backlight zones generates a plurality of brightness values according to a plurality of target uniformities for the plurality of backlight zones, and each backlight zone comprising at least one light source for emitting light; and a light source module, wherein the light source module comprises a substrate and a plurality of light-emitting diodes disposed on the substrate, the light source module defines a plurality of light-emitting zones arranged below the plurality of backlight zones, and each light-emitting zone comprises at least one of the light-emitting diode;

wherein the number of the plurality of light-emitting zones is greater than or equal to the number of the plurality of backlight zones;

wherein the surface light emitting device is divided into at least a first backlight area and a second backlight area, the second backlight area is closer to an edge of the surface light emitting device than the first backlight area, a first driving current of the plurality of driving currents is utilized for driving the light source of the backlight zone of the first backlight area, a second driving current of the plurality of driving currents is utilized for driving the light source of the backlight zone of the second backlight area, and the second driving current is greater than the first driving current;

wherein the surface light-emitting device further comprises an outer frame surrounding the plurality of backlight zones, and among the light-emitting zones arranged below the backlight zones on the same edge, the driving current utilized for driving at least one of the light-emitting diodes farther from the outer frame at one light-emitting zone is greater than the driving current utilized for driving at least one of the light-emitting diodes closer to the outer frame at another light-emitting zone.

2. The backlight control circuit of claim 1, wherein the first backlight area comprises a central backlight zone located at or near a center of the surface light-emitting device.

3. The backlight control circuit of claim 1, wherein the second backlight area comprises at least one backlight zone located at an outermost edge of the surface light-emitting device.

4. The backlight control circuit of claim 3, wherein the surface light-emitting device further comprises a third backlight area, the third backlight area comprises at least one corner backlight zone, and the second backlight area comprises at least one backlight zone located at the outermost edge of the surface light-emitting device except for the at least one corner backlight zone of the third backlight area, wherein a third driving current of the plurality of driving currents is utilized for driving the light source of the backlight zone of the third backlight area, and the third driving current is greater than the first driving current and the second driving current.

5. The backlight control circuit of claim 4, wherein the surface light-emitting device is quadrangular, the third backlight area comprises corner backlight zones located at four corners of the surface light-emitting device, and the second backlight area comprises backlight zones located at four outermost edges of the surface light-emitting device except for the corner backlight zones.

6. The backlight control circuit of claim 1, wherein the surface light-emitting device further comprises a third backlight area, the third backlight area at least partially surrounds the second backlight area, wherein a third driving current of the plurality of driving currents is utilized for driving the light source of the backlight zone of the third backlight area, and the third driving current is greater than the first driving current and the second driving current.

7. The backlight control circuit of claim 6, wherein the third backlight area comprises backlight zones located at all outermost edges of the surface light-emitting device.

8. The backlight control circuit of claim 1, wherein the surface light-emitting device further comprises a third backlight area, the third backlight area at least partially surrounds the second backlight area, wherein a third driving current of the plurality of driving currents is utilized for driving the light source of the backlight zone of the third backlight area, and the third driving current is greater than the first driving current and the second driving current.

* * * * *